United States Patent
Selkirk et al.

(10) Patent No.: US 8,744,668 B2
(45) Date of Patent: Jun. 3, 2014

(54) AUTOMOTIVE DIAGNOSTIC SERVER

(75) Inventors: Reed Selkirk, Kalamazoo, MI (US);
Thomas Bertosa, Chardon, OH (US);
Manokar Chinnadurai, Owatonna, MN (US)

(73) Assignee: Bosch Automotive Service Solutions LLC, Warren, MI (US)

( * ) Notice: Subject to any disclaimer, the term of this patent is extended or adjusted under 35 U.S.C. 154(b) by 0 days.

(21) Appl. No.: 13/467,523

(22) Filed: May 9, 2012

(65) Prior Publication Data

US 2013/0304306 A1 Nov. 14, 2013

(51) Int. Cl.
*G06F 7/00* (2006.01)
*G07C 5/00* (2006.01)
*G01M 15/04* (2006.01)
*G06Q 10/08* (2012.01)

(52) U.S. Cl.
CPC .............. *G07C 5/008* (2013.01); *G01M 15/04* (2013.01); *Y10S 707/99931* (2013.01); *Y10S 707/99934* (2013.01); *G06Q 10/08* (2013.01)
USPC ........ 701/31.4; 701/29.3; 701/31.5; 340/438; 340/439; 707/999.001; 707/999.004

(58) Field of Classification Search
CPC .................. G07C 5/008; G01M 15/04; Y10S 707/99931; Y10S 707/99943; G06Q 10/08
USPC .......... 701/1, 24, 29.4, 29.6, 31.5, 32.6, 32.7, 701/33.2, 33.4, 33.6, 34.3, 45, 101, 102, 701/115, 31.4, 29.3; 340/5.61, 5.72, 10.51, 340/438, 653, 870.01, 870.16, 439; 307/10.1, 10.2, 10.4, 10.5, 10.6; 73/597, 643, 655, 657, 660, 661; 180/282, 287; 342/51, 58, 61; 280/735; 702/183
See application file for complete search history.

(56) References Cited

U.S. PATENT DOCUMENTS

| | | | | |
|---|---|---|---|---|
| 4,258,421 A * | 3/1981 | Juhasz et al. | .................. | 701/33.2 |
| 4,602,127 A * | 7/1986 | Neely et al. | ...................... | 379/68 |
| 5,705,743 A * | 1/1998 | Leonard et al. | ............. | 73/114.61 |
| 6,247,348 B1 | 6/2001 | Yamakado et al. | | |
| 6,879,894 B1 * | 4/2005 | Lightner et al. | ............. | 701/31.4 |
| 7,050,892 B1 * | 5/2006 | Liebl et al. | .................... | 701/32.6 |
| 7,092,803 B2 * | 8/2006 | Kapolka et al. | ............. | 701/29.3 |
| 7,519,458 B2 * | 4/2009 | Buckley | ....................... | 701/31.5 |
| 2004/0117204 A1 | 6/2004 | Mazar et al. | | |
| 2004/0138790 A1 * | 7/2004 | Kapolka et al. | ................. | 701/29 |
| 2005/0038581 A1 * | 2/2005 | Kapolka et al. | ................. | 701/29 |
| 2005/0060070 A1 * | 3/2005 | Kapolka et al. | ................. | 701/29 |
| 2005/0065678 A1 * | 3/2005 | Smith et al. | ..................... | 701/29 |
| 2007/0083303 A1 * | 4/2007 | O'Sullivan et al. | ............. | 701/29 |
| 2007/0250232 A1 * | 10/2007 | Dourney et al. | ................ | 701/35 |

OTHER PUBLICATIONS

Canadian Office Action dated Nov. 19, 2013 for Canadian Application No. 2,590,570; filed May 28, 2007.

* cited by examiner

*Primary Examiner* — McDieunel Marc
(74) *Attorney, Agent, or Firm* — Baker & Hostetler LLP

(57) ABSTRACT

A system and method for an automotive diagnostic server can provide a portable vehicle diagnostic tool to identify a failed vehicle component. It may also provide a remote information device to serve as a connecting intermediary between devices, and to allow remote control of the devices and to provide information to a user. A remote diagnostic device to analyze data and interpret information to aid the user in making, using, maintaining, and fixing a piece of equipment or product may also be included. Web server functionality may be incorporated into the portable vehicle diagnostic tool to allow dissemination of the diagnostic information resulting from the diagnostic testing, and the web server may be accessed by a web browser of the remote information device.

23 Claims, 6 Drawing Sheets

AUTOMOTIVE DIAGNOSTIC SERVER

FIELD OF THE INVENTION

The present invention relates generally to diagnostic equipment. More particularly, the present invention relates to providing an interface to conduct diagnostic tests on a subject, such as a vehicle, and an interface to provide diagnostic information on a separate device for display.

BACKGROUND OF THE INVENTION

In many industries, diagnostic systems play an increasingly important role in manufacturing processes, as well as in maintenance and repair throughout the lifetime of the equipment or product. Some diagnostic systems are based on personal computer technology and feature user-friendly, menu-driven diagnostic applications. These systems assist technicians and professionals at all levels in performing system diagnostics.

With equipment and products becoming more advanced, more complex, and more expensive with the addition of electronic components the knowledge base and financial resources required to properly use, maintain, and fix these items have grown immensely. Moreover, the amount of peripheral information and devices relating to the use, maintenance, and repair of the equipment and products has also increased. Access to all of this information while keeping expenses down is crucial to proper and efficient use, maintenance, and repair of the equipment and products. But, access alone is insufficient. For the best results for using the available information, it must be accessible in a timely manner, generally the faster the better, it must be accurate, and one must know how to use it. However, all of this may be very daunting for one piece of equipment or product. The management of all of this information only increases with every piece of equipment or product used, maintained, or fixed. Today, such large amounts of information may be managed from locations remote to a diagnostic tool and delivered to a user electronically.

It is desirable to provide a method and system to provide diagnostic information to a user in a timely and cost effective manner. More specifically providing an interface for the user to access diagnostic information on a device that allows the user freedom to quickly access diagnostic information without needing to figure out the various communication protocols to communicate between the devices.

SUMMARY OF THE INVENTION

The foregoing needs are met, to a great extent, by the present invention, wherein in one aspect, a method and apparatus are provided such that in some embodiments allows various devices to communicate with each other.

In accordance with one embodiment of the present invention, a method for communicating with a diagnostic tool is provided and includes the steps of retrieving vehicle diagnostic data from a vehicle with the diagnostic tool, providing a web page via a web server module that is stored in a memory of the diagnostic tool, receiving a connection request from a remote computing device to access the web page, connecting the remote computing device to the diagnostic tool over a communication network via a communication interface of the remote computing device and the diagnostic tool, receiving input signals from the remote computing device via the communication interface of the diagnostic tool, performing a function on the diagnostic tool based on the input signals, and sending the information based on the function to the remote computing device.

In accordance with yet another embodiment of the present invention, a vehicle diagnostic tool is provided and includes a processor configured to execute program modules, a memory configured to store the program modules, a communication interface configured to connect with a connector in a vehicle and retrieve vehicle diagnostic data from the vehicle, a display configured to display information, and a communication device configured to communicate with a remote computing device over a communication network, wherein the program modules comprises a web server module configured to provide a web page on the display, the web page hosted on the vehicle diagnostic tool that is accessible by the remote computing device and a data analysis module configured, when instructed, to analyze the vehicle diagnostic data In accordance with still another embodiment of the present invention, a vehicle diagnostic tool is provided and includes means for processing configured to execute program modules, means for storing the program modules, means for displaying information, means for interfacing with a connector in a vehicle and retrieve vehicle diagnostic data from the vehicle, and means for communicating with a remote computing device over a communication network, wherein the program modules comprises a web server module configured to provide a web page on the means for displaying, the web page hosted on the vehicle diagnostic tool that is accessible by the remote computing device and a data analysis module configured, when instructed, to analyze the vehicle diagnostic data.

In accordance with another embodiment of the present invention, a vehicle diagnostic tool is provided and includes a processor configured to execute program modules, a memory communicatively linked to the processor and configured to store the program modules and software to operate the vehicle diagnostic tool, a display configured to display information, an input device configured to receive inputs, a communication interface configured to connect with a connector in a vehicle and retrieve vehicle data from the vehicle, and a communication device configured to communicate with a remote computing device over a communication network, wherein the program modules comprises a web server module configured to provide a web page on the display, the web page hosted on the vehicle diagnostic tool that is accessible by the remote computing device and a data analysis module configured, when instructed, to analyze the vehicle data There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

An embodiment of the present inventive method and system for an automotive diagnostic server can provide a portable vehicle diagnostic tool to identify a failed vehicle component. The portable vehicle diagnostic tool can perform a combination of functions. Such functions may include diagnostic testing of vehicle components and systems. The portable vehicle diagnostic tool may use its functionality to help a technician determine if there is a vehicle component failure and if so, which component has failed. Web server functionality may be incorporated into the portable vehicle diagnostic tool to allow dissemination of the diagnostic information resulting from the diagnostic testing. In one embodiment, the portable vehicle diagnostic tool can route the information received to an appropriate destination for viewing or for analysis and interpretation to aid a user in making, using, maintaining, diagnosing and fixing a piece of equipment or product, such as a vehicle. The portable vehicle diagnostic tool is able to analyze and interpret the diagnostic information. In another embodiment, the portable vehicle diagnostic tool can receive, route, and/or analyze the information in real-time.

The method and system can further provide a remote information device. The remote information device can receive information from a variety of sources, such as the portable vehicle diagnostic tool and other networked computing devices and display them to the user. In one embodiment, the remote information device may route the information received to an appropriate destination for analysis and interpretation to aid the user in making, using, maintaining, diagnosing, and fixing a piece of equipment or product. In another embodiment, the remote information device can receive, route, and/or analyze the information in real-time.

Another feature of the method and system can include a remote diagnostic device. The remote diagnostic device can receive information from a variety of sources, such as the portable vehicle diagnostic tool, the remote information device, and other networked computing devices to analyze data and interpret information to aid the user in making, using, maintaining, diagnosing, and fixing a piece of equipment or product. The remote diagnostic device may also route the results of its analysis and interpretation to an appropriate location, or make the results available for access from a permitted device. In one embodiment, the remote diagnostic device can receive, route, and/or analyze the information in real-time.

Figure 1:
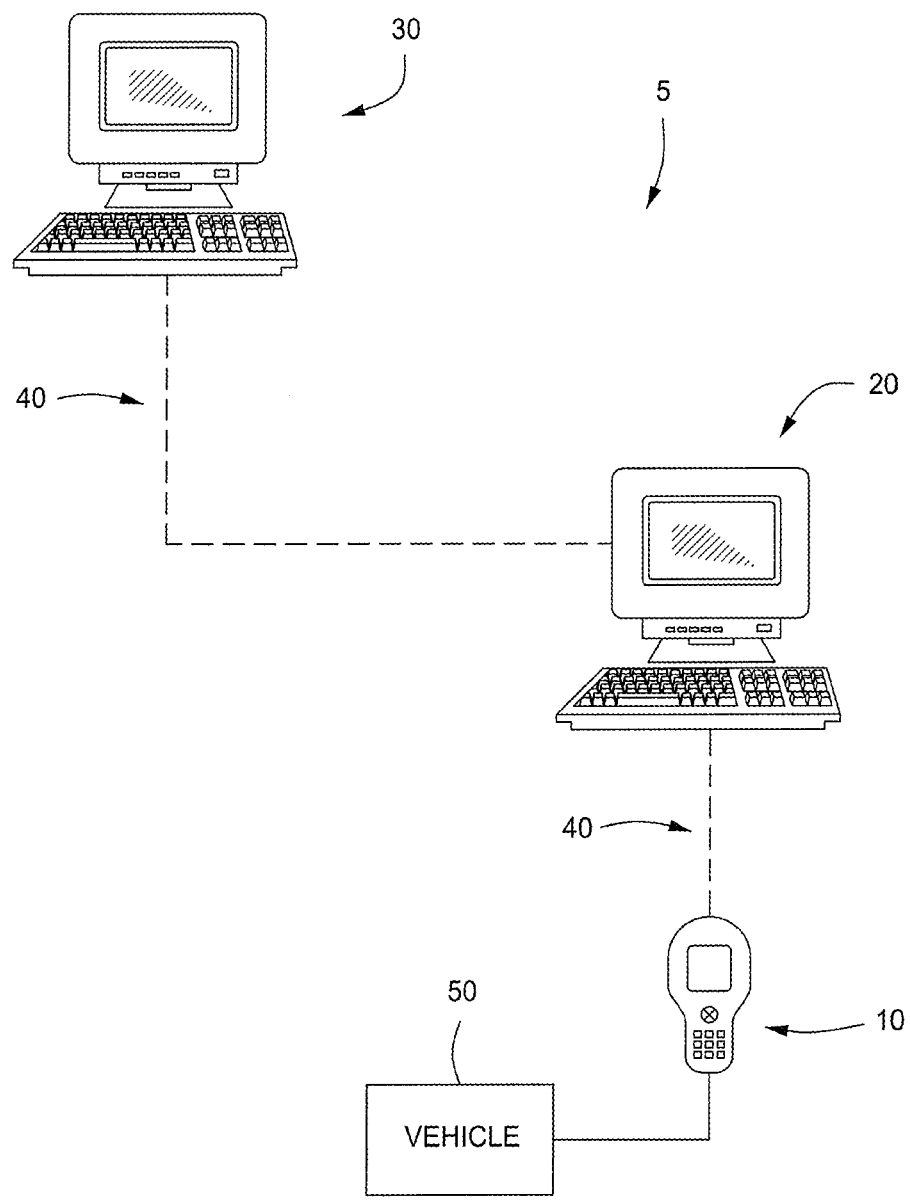
FIG. 1 is a schematic diagram illustrating a system for an automotive diagnostic server according to an embodiment of the invention.

The invention will now be described with reference to the drawing figures, in which like reference numerals refer to like parts throughout. An embodiment of the present inventive system is illustrated in FIG. 1, which illustrates a system for an automotive diagnostic server 5 according to an embodiment of the invention. The automotive diagnostic server system 5 can gather data about the failure of a component and combine data from various sources to provide desired information to the user, such as top fixes for that failed component. The information provided to the user, or culminated information, provides pertinent information about component failures to the user, though the culminated information is not limited to solely component failure information as described herein. Through application of the automotive diagnostic server system 5, the user receiving the culminated information on the failed components can make decisions, such as to modify an action that would have resulted in increasing component failure, or conducting component maintenance or repairs.

In one embodiment, the automotive diagnostic server system 5 can include the portable vehicle diagnostic tool 10, the remote information device 20, and the remote diagnostic device 30. The portable vehicle diagnostic tool can be linked to a vehicle 50 at the OBD II port in order to retrieve vehicle diagnostic data, such as diagnostic trouble codes (DTCs). The portable vehicle diagnostic tool 10, the remote information device 20, and the remote diagnostic device 30 may be a general computing device, such as a personal computer (PC), a UNIX workstation, a server, a mainframe computer, a personal digital assistant (PDA), smartphone, cellular phone, a tablet computer, a slate computer, or some combination of these. Alternatively, the portable vehicle diagnostic tool 10, the remote information device 20, and the remote diagnostic device 30 may be a specialized computing device, such as a vehicle diagnostic scan tool. The components of the portable vehicle diagnostic tool 10, the remote information device 20, and the remote diagnostic device 30 may include programming code, such as source code, object code or executable code, stored on a computer-readable medium that may be loaded into the memory and processed by the processor in order to perform the desired functions of the automotive diagnostic server system.

Figure 2A:
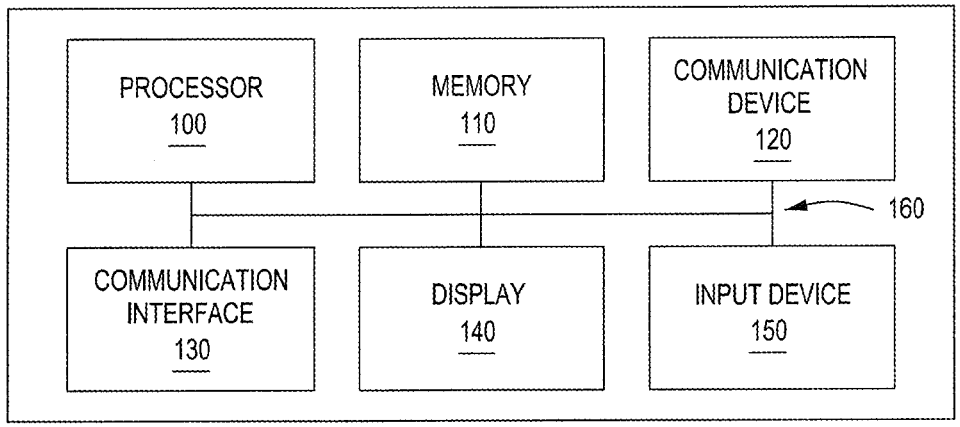
FIG. 2A is a block diagram illustrating a portable vehicle diagnostic tool of a system for an automotive diagnostic server according to an embodiment of the invention.
Figure 2B:
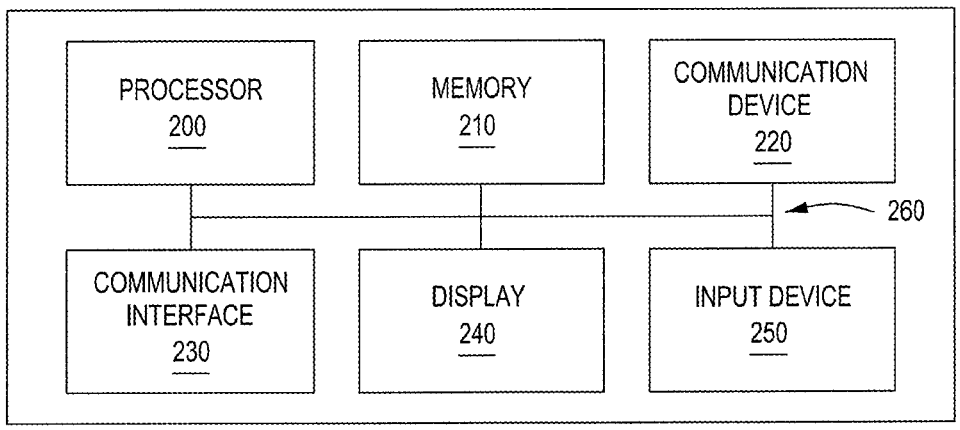
FIG. 2B is a block diagram illustrating a remote information device of a system for an automotive diagnostic server according to an embodiment of the invention.
Figure 2C:
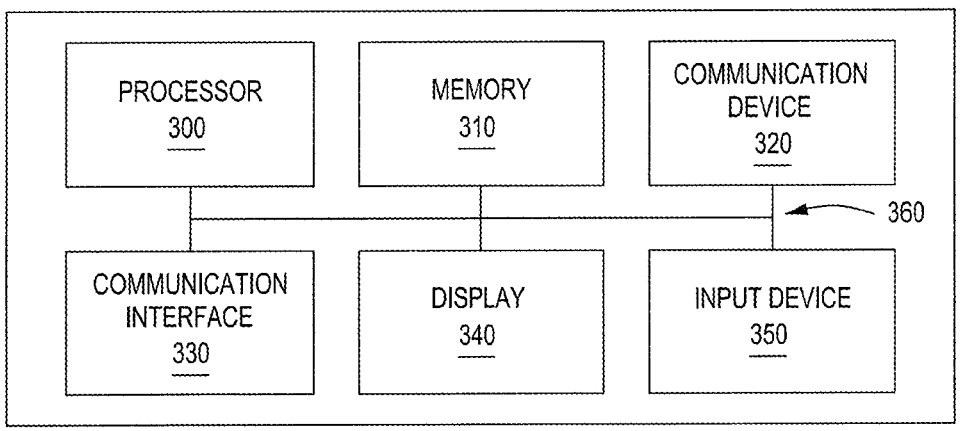
FIG. 2C is a block diagram illustrating a remote diagnostic device of a system for an automotive diagnostic server according to an embodiment of the invention.

The portable vehicle diagnostic tool 10, the remote information device 20, and the remote diagnostic device 30 may communicate with each other over a communication network 40 via their respective communication interfaces 130, 230, 330, (see FIGS. 2A, 2B, 2C). The communication network 40 can include any viable combination of devices and systems capable of linking computer-based systems, such as the Internet; an intranet or extranet; Wi-Fi, a local area network (LAN); a wide area network (WAN); a direct cable connection; a private network; a public network; an Ethernet-based system; a token ring; a value-added network; a telephony-based system, including, for example, T1 or E1 devices; an Asynchronous Transfer Mode (ATM) network; a wired system; a wireless system; an optical system; cellular system; satellite system; a combination of any number of distributed processing networks or systems or the like.

In another embodiment, the portable vehicle diagnostic tool 10 may act as a web server so that information retrieved from the vehicle or another computing device may be accessible to the remote information device 20, and the remote diagnostic device 30 via a web page. As long as the remote information device 20 and the remote diagnostic device 30 have thereon a web browser, such as Microsoft Explorer, Apple Safari, or Mozilla Fire Fox, or similar browsers, they can access information on the vehicle diagnostic tool. Additionally, any device that accesses the web page can cause the diagnostic tool to perform the functions described herein such as analyzing vehicle diagnostic data or send the data to another device. The web page illustrates information including the vehicle diagnostic data and any potential fixes. Other vehicle information can also be illustrated such as diagrams, make, model and year. Thus, regardless of the operating system (Linux, Microsoft, Apple, etc.) used by the portable vehicle diagnostic tool 10, the remote information device 20, and the remote diagnostic device 30, they may communicate with each other through the web browser. The web browser allows for information (such as diagnostic data) to be uploaded and downloaded from the respective devices or allows the various devices having the web page to perform certain functions. It is within the spirit of the invention that some or all of the portable vehicle diagnostic tool 10, the remote information device 20, and the remote diagnostic device 30 may act as a web server for the other devices.

In still another embodiment, the portable vehicle diagnostic device 10 may interact with cellular phones, smart phones, PDA and the like. Again, through the use of the web browser, these devices can access information on the portable vehicle diagnostic tool 10 regardless of the operating system (Windows CE, Apple OS, Google Android, etc.) or communication protocols (USB, Bluetooth) that are equipped thereon. This is helpful to the vehicle owner who may want to take the diagnostic data retrieved by the portable vehicle diagnostic device 10 in order to return home to fix the vehicle himself. This situation may occur when the owner does not own a portable vehicle diagnostic tool 10 or does not have one that includes the necessary software to diagnose the problems of the vehicle. Also by having this data, the owner can also purchase the correct replacement component to give to the technician or use at home to fix the vehicle.

Referring now to FIGS. 2A-C, each of the portable vehicle diagnostic tool 10 (FIG. 2A), the remote information device 20 (FIG. 2B), and the remote diagnostic device 30 (FIG. 2C) can include a processor 100, 200, 300, a memory 110, 210, 310, a communication device 120, 220, 320, a communication interface 130, 230, 330, a display 140, 240, 340, an input device 150, 250, 350, and a communication bus 160, 260, 360, respectively.

The processor 100, 200, 300, may be configured in different ways, including having single, dual, quad, 8, 16 or 32 core, for different embodiments of each of the portable vehicle diagnostic tool 10, the remote information device 20, and the remote diagnostic device 30. One option is that the processor 100, 200, 300, is a device that can read and process data such as a program instruction stored in the memory 110, 210, 310, or received from an external source. Such a processor 100, 200, 300, may be embodied by a microcontroller or may be a collection of electrical circuitry components built to interpret certain electrical signals and perform certain tasks in response to those signals. In other embodiments, the processor 100, 200, 300, may be an integrated circuit, a field programmable gate array (FPGA), a complex programmable logic device (CPLD), a programmable logic array (PLA), an application specific integrated circuit (ASIC), or a combination thereof. Different complexities in the programming may affect the choice of type or combination of the above to comprise the processor 100, 200, 300.

Similar to the choice of the processor 100, 200, 300, the configuration of software of the portable vehicle diagnostic tool 10, the remote information device 20, and the remote diagnostic device 30 (further discussed herein) may affect the choice of memory 110, 210, 310, used in the portable vehicle diagnostic tool 10, the remote information device 20, and the remote diagnostic device 30, respectively. Other factors may also affect the choice of memory 110, 210, 310, such as price, speed, durability, size, capacity, and reprogrammability. Thus, the memory 110, 210, 310 may be, for example, volatile, non-volatile, solid state, magnetic, optical, permanent, removable, writable, rewriteable, or read-only memory. If the memory 110, 210, 310, is removable, examples may include a CD, DVD, or USB flash memory, which may be inserted into and removed from a CD and/or DVD reader/writer (not shown), or a USB, Fire-Wire, Serial, Parallel port (not shown). The CD and/or DVD reader/writer, and the ports may be integral or peripherally connected to the portable vehicle diagnostic tool 10, the remote information device 20, and the remote diagnostic device 30.

In various embodiments, the portable vehicle diagnostic tool 10, the remote information device 20, and the remote diagnostic device 30 may be coupled to the communication network 40 (see FIG. 1) by way of the communication device 120, 220, 320. In various embodiments the communication device 120, 220, 320 can incorporate any combination of devices—as well as any associated software or firmware—configured to couple processor-based systems, such as modems, network interface cards, serial buses, parallel buses, LAN or WAN interfaces, wireless or optical interfaces and the like, along with any associated transmission protocols, as may be desired or required by the design.

Working in conjunction with the communication device 120, 220, 320, the communication interface 130, 230, 330, can provide the hardware for either a wired or wireless connection. For example, the communication interface 130, 230, 330, may include a connector or port for an OBD (On Board Diagnostic), Ethernet, USB, FireWire, serial, parallel, or other types of physical connection. In other embodiments, the communication interface 130, 230, 330, may include an antenna for sending and receiving wireless signals for various protocols, such as, Bluetooth, ZigBee, cellular telephony, satellite, and other communication protocols. The portable vehicle diagnostic tool 10, the remote information device 20, and the remote diagnostic device 30 can include one or more communication interfaces 130, 230, 330, designed for the same or different types of communication and can be designed to handle more than one type of communication at a time.

Additionally, an embodiment of the portable vehicle diagnostic tool 10, the remote information device 20, and the remote diagnostic device 30 may communicate information to the user through the display 140, 240, 340, respectively, and request user input through the input device 150, 250, 350, respectively, by way of an interactive, menu-driven, visual display-based user interface, or graphical user interface (GUI). Alternatively, the communication may be text based only, or a combination of text and graphics, such as a web page. In other embodiments, the input device may be executed, for example, on a personal computer (PC) with a mouse and keyboard, with which the user may interactively input information using direct manipulation of the GUI. Direct manipulation may include the use of a pointing device, such as a mouse or a stylus, to select from a variety of selectable fields, including selectable menus, web pages, drop-down menus, tabs, buttons, bullets, checkboxes, text boxes, and the like. Other input devices include a trackball, a scroll wheel, a touch screen or a voice-activated system.

The different components of the portable vehicle diagnostic tool 10, the remote information device 20, and the remote diagnostic device 30 can be linked together, to communicate with each other, by the communication bus 160, 260, 360, respectively. In various embodiments, any combination of the components can be connected to the communication bus 160, 260, 360, while other components may be separate from the portable vehicle diagnostic tool 10, the remote information device 20, and the remote diagnostic device 30 and may communicate to the other components by way of the communication interface 130, 230, 330.

Some applications of the automotive diagnostic server system 5 may not require that all of the elements of the system be separate pieces. For example, in some embodiments, combining the portable vehicle diagnostic tool 10 and the remote information device 20, or the remote diagnostic device 30 may be possible. Such an implementation may be useful in a small shop where only a small number of portable vehicle diagnostic tools 10 are used.

Alternatively, having the portable vehicle diagnostic tool 10, the remote information device 20, and the remote diagnostic device 30 as separate devices within the automotive diagnostic server system 5 provides certain flexibilities. For example, in a nationwide implementation, the remote diagnostic device 30 may be a centralized device hosted by an entity in a remote location. Then individual service shops, for example, may each have vehicle diagnostic tool 10 and/or the remote information device 20 that connects to the remote diagnostic device 30 to retrieve the pertinent information, which may include some or all of the culminated information. Further, large service shops may have multiple portable vehicle diagnostic tools 10 to provide information to one or individual remote information devices 20. The automotive diagnostic server system 5 encompasses multiple embodiments.

Figure 3A:
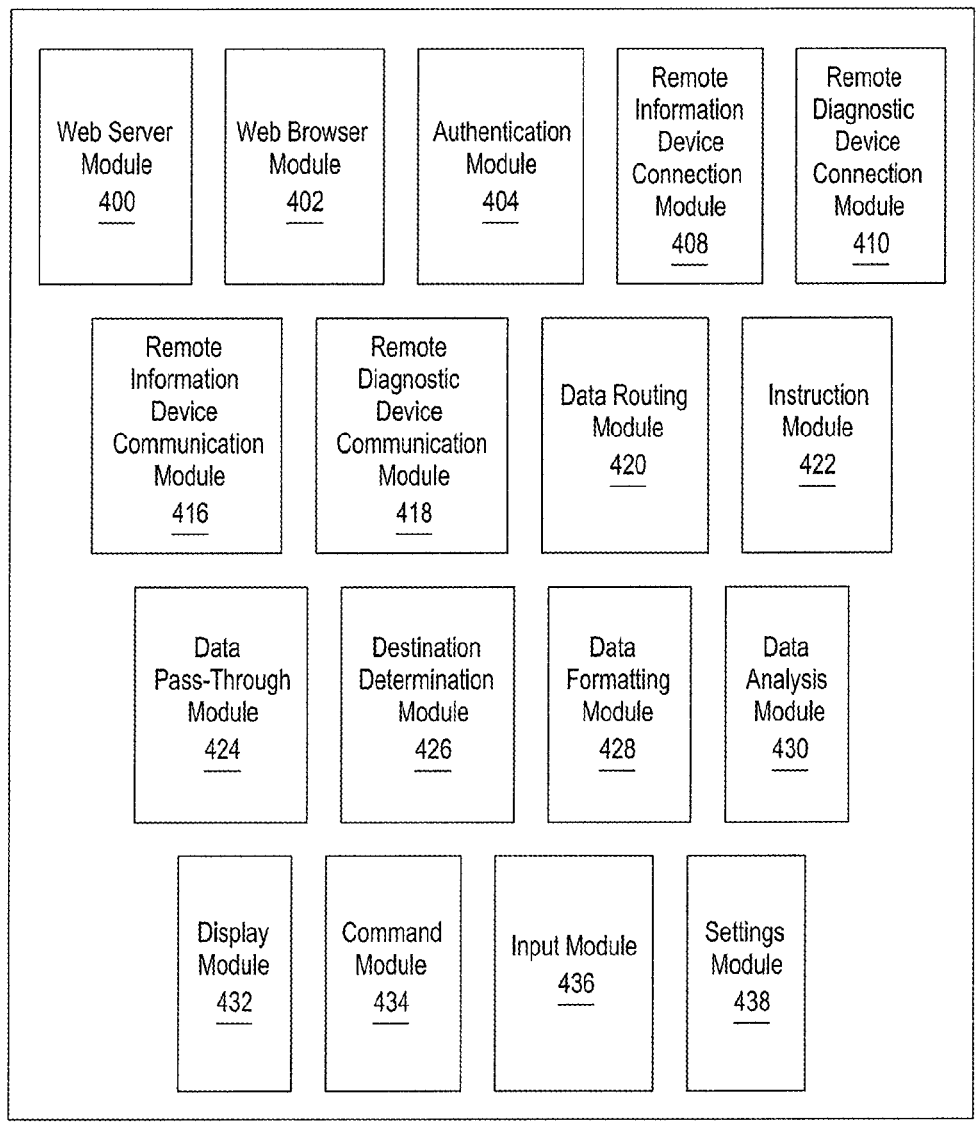
FIG. 3A is a block diagram illustrating the modules of a portable vehicle diagnostic tool of a system for an automotive diagnostic server according to an embodiment of the invention.
Figure 3B:
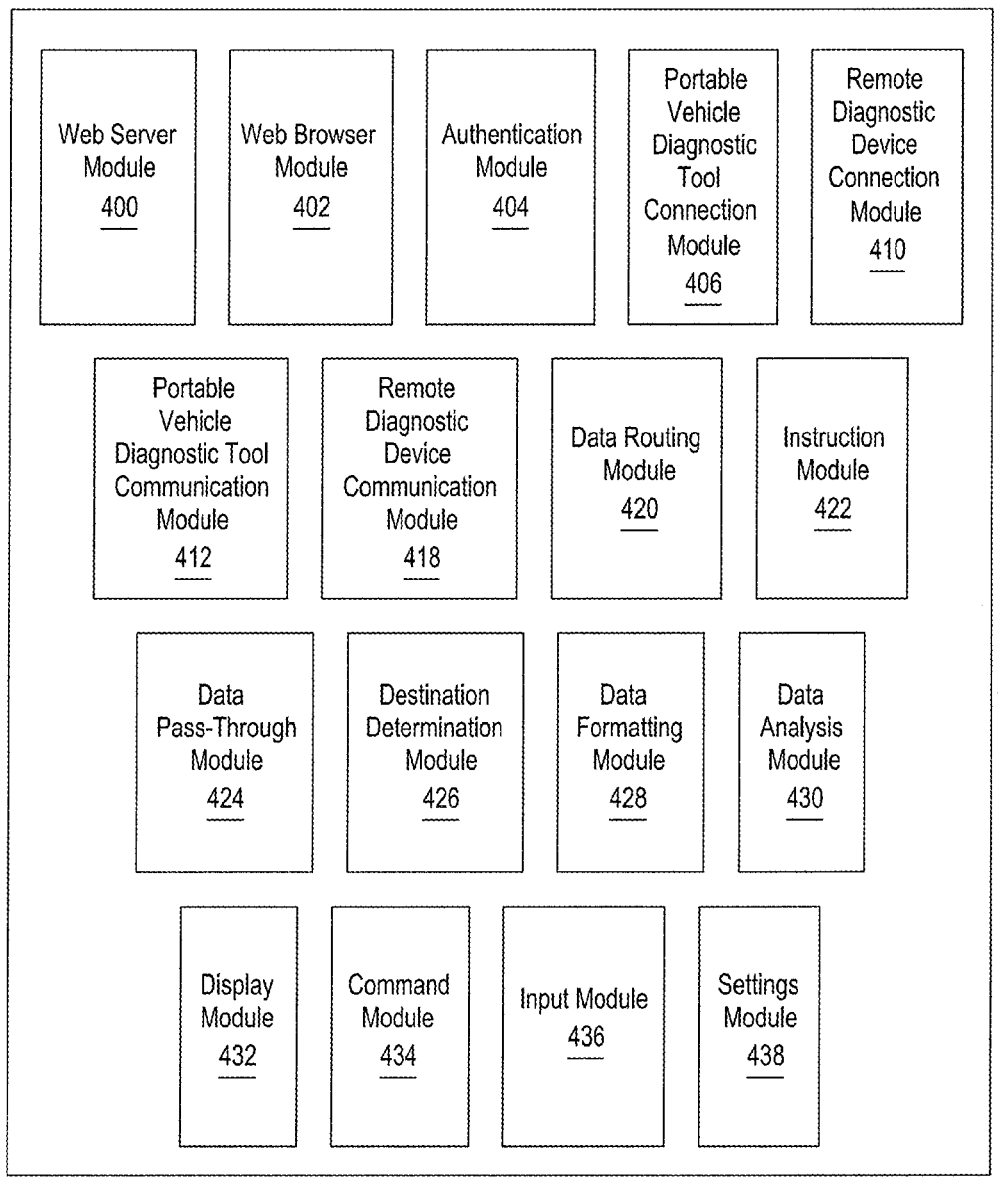
FIG. 3B is a block diagram illustrating the modules of a remote information device of a system for an automotive diagnostic server according to an embodiment of the invention.
Figure 3C:
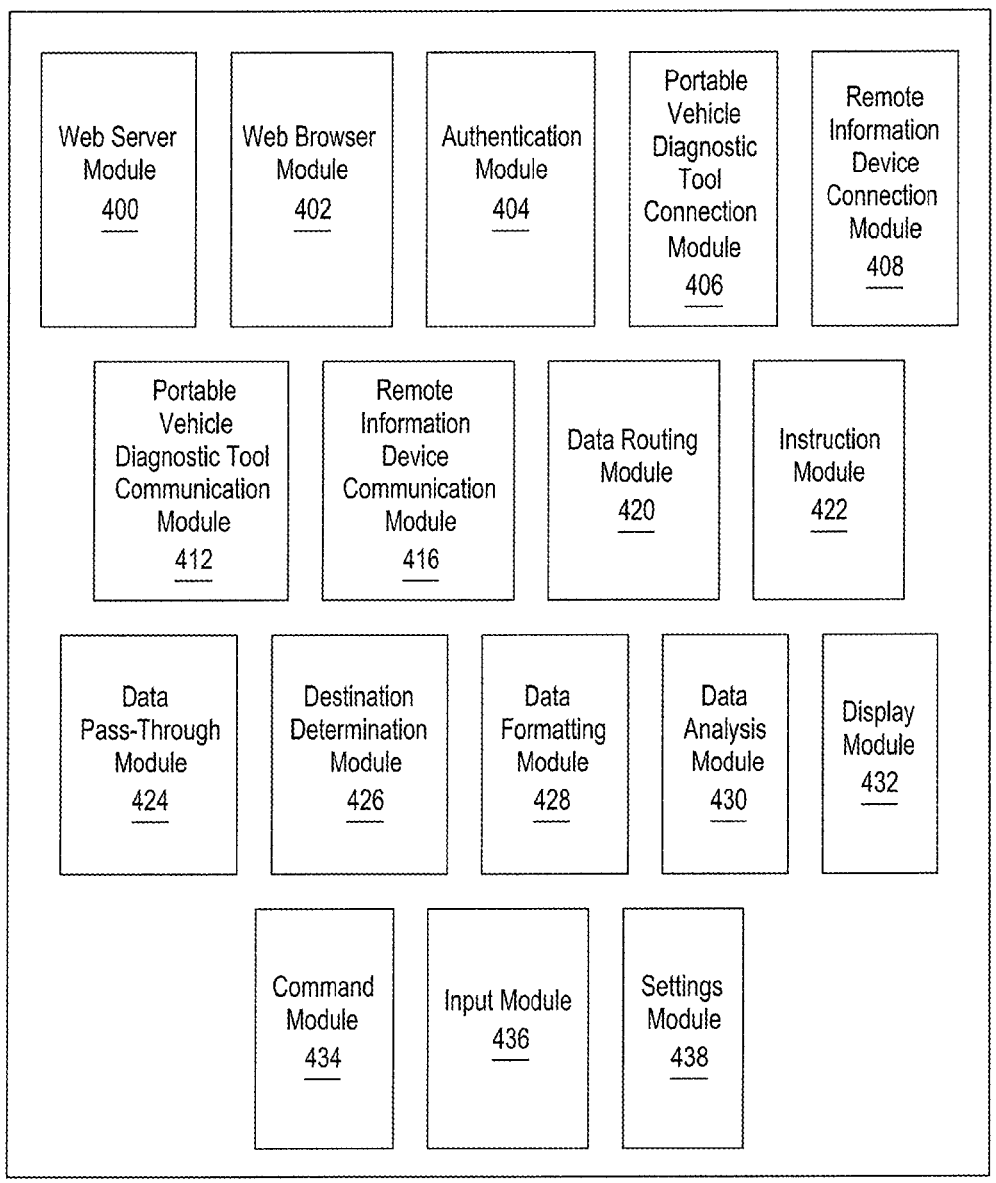
FIG. 3C is a block diagram illustrating the modules of a remote diagnostic device of a system for an automotive diagnostic server according to an embodiment of the invention.

Referring now to FIGS. 3A-C, the memory 120 (FIG. 3A), 220 (FIG. 3B), 320 (FIG. 3C), may store a variety of programmed software instruction modules, which may be executed by the processor 110, 210, 320. Although different modules are shown for various memories in FIGS. 3A-C, any or all of the modules may be on the memory 120, 220, 320. The modules may include: a web server module 400, a web browser module 402, an authentication module 404, a portable vehicle diagnostic tool connection module 406, a remote information device connection module 408, a remote diagnostic device connection module 410, a portable vehicle diagnostic tool communication module 412, a remote information device communication module 416, a remote diagnostic device communication module 418, a data routing module 420, an instruction module 422, a data pass-through module 424, a destination determination module 426, a data formatting module 428, a data analysis module 430, a display module 432, a command module 434, an input module 436, and a settings module 438.

When using the remote information device 20, a user may first open a program. The program may be configured to start upon selection of the program or upon startup of the remote information device 20. In one embodiment, the program includes the web browser module 402 which can open a window on the display 240 of the remote information device 20, encapsulating a user interface of a web browser, through which the user may interact with the automotive diagnostic server system 5 including the portable vehicle diagnostic tool 10. Upon initiating, the web browser module 402 can call the display module 432 to display an initial set of options for the program. Such options may include program preferences, connection options, and options for retrieving stored data or data on the portable vehicle diagnostic tool 10.

The user may interact with the program and the remote information device 20 through the input device 250. Signals from the input device 250 are received by the input module 436 and interpreted as commands for the program and the web browser module 402. Some such commands may include controlling the information on the display 240 of the remote information device 20, thus executing the display module 432 to alter the GUI and/or displaying information received from the devices 10, 30 through the web page according to one embodiment. In another embodiment, the GUI may provide the user with options to connect the remote information device 20 to other devices 10, 30, to send and/or retrieve information. The user may interact with the input device 250 to select one or more devices 10, 30, to connect to, and to instruct what information to send and/or retrieve from. The interaction with the input device 250 creates signals that are received by the input module 436 and converted to commands representing the user's selections that are passed to the instruction module 422 for execution.

When executing the command to connect to or send to and/or retrieve information from the other devices 10, 30, generally, the portable vehicle diagnostic tool 10 connects with the remote information device 20, and the remote information device 20 connects with the remote diagnostic device 30 over the communication network 40. However, any order of connections is possible. Information that the portable vehicle diagnostic tool 10 retrieves from the vehicle, such as engine control unit and vehicle system data, which may include diagnostic and failure codes, performance measurements, parts and software identifiers, non-diagnostic information, etc., may be received by the remote information device 20 from the portable vehicle diagnostic tool 10. This information may be transmitted via accessing the web page on the portable vehicle diagnostic tool 10 by the remote information device 20.

The remote information device 20 may then provide the information, in either the form in which it was received or in an altered form, to the remote diagnostic device 30 via the communication network 40. This information may be transmitted via accessing the web page on the remote information device 20 by the remote diagnostic device 30. The remote diagnostic device 30 may then conduct any combination of: (1) forwarding the data, as received or altered, to another remote diagnostic device 30, or (2) returning data to the remote information device 20 resulting from an analysis of the data received, or (3) returning data requested by the remote information device 20 where it may be displayed to the user and/or (4) be sent to the vehicle diagnostic tool 10. The functions of the remote information device 20 may vary from one embodiment to another and are discussed further herein. Moreover, any of the functions discussed herein may be executed in real-time, thus making the processes, for which the automotive diagnostic server system 5 is implemented, faster and more efficient. Functions may be executed in real-time independently from other functions, thus not relying on the entire automotive diagnostic server system 5 to be implemented in real-time for some real-time functionality to be available.

In one embodiment, the connections between the portable vehicle diagnostic tool 10, the remote information device 20, and the remote diagnostic device 30 can occur over an Internet connection through the execution of the web server module 400, either as part of the portable vehicle diagnostic tool 10 and/or as part of the global Internet support structure. Communications with or through the remote information device 20 to the portable vehicle diagnostic tool 10, and the remote diagnostic device 30 can be executed through the web browser application running on the remote information device 20. By communicating through a web browser application, any computing device can communicate with the remote information device 20 without regards to obtaining the correct communication protocols each device.

The web browser can be directed to a web page hosted by the web server of the portable vehicle diagnostic tool 10, implemented by the web server module 400 (further described herein). Thus, a channel of communication is opened on the network 40, between the portable vehicle diagnostic tool 10 and the remote information device 20. To create this connection, the web browser can call the portable vehicle diagnostic tool connection module 406, and in doing so, may either initiate a connection between the remote information device 20 and the portable vehicle diagnostic tool 10, or respond to a request to initiate the connection between the two devices. In one embodiment, the portable vehicle diagnostic tool connection module 406 may engage the communication device 220 of the remote information device 20 to send a connection signal to, and then receive a connection confirmation or denial signal from the communication device 120 of the portable vehicle diagnostic tool 10.

In an alternative embodiment, the portable vehicle diagnostic tool connection module 406 may engage the communication device 220 of the remote information device 20 to listen for a connection signal from the communication device 120 of the portable vehicle diagnostic tool 10. Upon receiving the connection signal, the portable vehicle diagnostic tool connection module 406 may call the authentication module 404 to identify the portable vehicle diagnostic tool 10 by, for example, make and model, and username and password, and then determine the appropriate connection response for either accepting or denying the connection, and sending a response signal. Moreover, the portable vehicle diagnostic tool connection module 406 may also be responsible for terminating an established connection in an analogous manner, either initiating or responding to a connection termination request.

Similar to the portable vehicle diagnostic tool connection module 406, the remote diagnostic device connection module 410 may also initiate or respond to connection or termination request signals with the communication device 320 of the remote diagnostic device 30. While the portable vehicle diagnostic tool connection module 406 and the remote diagnostic device connection module 410 may be similar in function and execution, differences may arise. For example, selecting the appropriate protocol for the connection between the remote information device 20 and the other devices 10, 30, may differ based on the technology used in each, potentially influenced by cost, efficiency, and environment. In some instances a Wi-Fi or similar short range wireless protocol, like Bluetooth, ZigBee, or Near Field Communication, may be used to connect the remote information device 20 and the portable vehicle diagnostic tool 10 when they are located within a small enough area. However, an Internet protocol, such as TCP/IP, may be implemented to connect the remote information device 20 and the remote diagnostic device 30 if they are located on an expansive network like the Internet. Many varying combinations of networks and protocols may be implemented to connect the devices 10, 20, 30. However, if web browsers are utilized for communication then communications between devices 10, 20, 30 are easily facilitated without regards to communication protocols of each of the respective devices.

Once the connection between the remote information device 20 and at least one of the other two devices 10, 30, is established, the portable vehicle diagnostic tool connection module 406 and/or the remote diagnostic device connection module 410 may engage the communication device 220 of the remote information device 20 to transmit and receive information. The communication between the remote information device 20 and the other two devices 10, 30, may involve the remote information device 20 sending an initial query or request for information and then receiving information in response, or initially receiving information without first making a query or request.

The remote information device connection module 408 may be similarly implemented as the portable vehicle diagnostic tool connection module 406 and the remote diagnostic device connection module 410. The difference between the remote information device connection module 408 and the other modules 406, 410, is that it may be implemented by the portable vehicle diagnostic tool 10 and/or the remote diagnostic device 30 to connect and communicated with the remote information device 20.

In some embodiments more than one portable vehicle diagnostic tool 10 or more than one remote diagnostic device 30 can be connected to the remote information device 20. In such instances, the remote information device 20 may be sending data to and/or receiving data from multiple sources. When communicating between the remote information device 20 and the other devices 10, 30, the web browser module 402 may call the data routing module 420 to manage the incoming and outgoing traffic by keeping track of information and where it came from and where it should be sent to. Keeping track of the information and its source or destination may involve keeping records of the traffic in the memory 210 of the remote information device 20. Then the data routing module 420 may instruct the portable vehicle diagnostic tool's communication module 412 and/or the remote diagnostic device communication module 418 to direct the information to a particular device 10, 30. Alternatively, the data routing module 420 may tag each packet of information with a source and/or destination identifier, and the identifier may be carried with the information packet when it is sent and received. Then the web browser module 402 may call the communication modules 412, 418, to read the tags and direct the information packets to the correct device 10, 30. Moreover, the data routing module 420 and the remote information device communication module 416 may be similarly implemented on the portable vehicle diagnostic tool 10 and the remote diagnostic device 30 to communicate with the remote information device 20.

In one embodiment, the remote information device 20 may only receive information from the other devices 10, 30, once the devices have completed a task and gathered all of the information to be sent at once. In such an embodiment, the remote information device 20 must wait for the other devices 10, 30, to complete the task and receive all of the information in bulk. Another embodiment may allow the remote information device 20 to receive information from the other devices 10, 30, in real-time. In this embodiment, the portable vehicle diagnostic tool 10 may send to the remote information device

20, the information it receives from the vehicle as it receives the information or in real-time. Thus, the portable vehicle diagnostic tool 10 does not have to complete receiving all of the information it is getting from the vehicle before passing it to the remote information device 20. Similarly, information from the remote diagnostic device 30 may be sent to and received by the remote information device 20 in real-time. Additionally, the remote information device 20 may send information to the other devices 10, 30, in real-time.

When information is received from either the portable vehicle diagnostic tool 10 or the remote diagnostic device 30, the web browser module 402 may execute the display module 432 to display information on the display 240 of the remote information device 20. The information available to the display module 432 may include elements of the GUI for interacting with the remote information device 20 through the web browser, and with the information received from the other devices 10, 30. The information received may be displayed graphically as it is received, or a representation of a data analysis may be displayed as it occurs.

Like in the initial instance of running the program, the user can again interact with the program and the remote information device 20 through the input device 250. The information received may dictate the commands available to the user through the input device 250. Some such commands may include controlling the information on the display 240 of the remote information device 20, thus requesting the display module 432 to alter the GUI and/or displaying information received from the devices 10, 30. At times where there is a desire to further process the information received, the GUI may again provide the user with options to connect the remote information device 20 to other devices 10, 30, to send and/or retrieve information. The user may interact with the input device 250 to select one or more devices 10, 30, to connect to, and to instruct what information to send and/or retrieve. Thereon, the instruction module 422 executes the user's selection by calling the appropriate modules and passing them the necessary information.

When executed, the instruction module 422 may evaluate the information received, based on the instruction selected by the user, and determine what, if anything needs to be done with the information, and then instruct the remote information device 20 to execute further functions for data processing. In instances where the information is received or sent by the remote information device 20 in real-time, the instruction module 422 may also be executed in real-time. In some embodiments it may not be possible to make a final determination on the information until all of the information is received, however, the evaluation of the information may be executed in real-time so that the time necessary to make the determination on the information is reduced.

A pass-through function may be executed after receiving information at the remote information device 20 using the data pass-through module 424 (which can be executed in real time). The user may select to pass the information received from one of the devices 10, 30, to the other device 10, 30. The instruction module 422 may determine that the information does not need any alteration, yet the information still needs to reach its destination. Thus, the data pass-through module 424 may be implemented such that the information received at one end is unaltered and is the same information that is sent out at another end.

Other command selections made by the user in the web browser may require the instruction module 422 to make one or more modifications to the information received at the remote information device 20. In one embodiment, the portable vehicle diagnostic tool 10 may have limited functionality such that it cannot provide instructions, or that it can only provide limited instructions, for the handling of the information that the remote information device 20 receives from it or sends to it. Thus, the instruction module 422 may have to determine that one or more of the remote information device's functions should be implemented to properly handle the information. While various instances of the descriptions of the functions of the various modules may be directed to either the portable vehicle diagnostic tool 10 or the remote diagnostic device 30, one skilled in the art would recognize that any of the functions of the various modules may similarly be applied to any of the devices 10, 20, 30.

In one instance, the remote information device 30 may receive a raw or processed data sent from the portable vehicle diagnostic tool 10. The user may select a command that requires the information to be processed in a particular way, but no particular destination is chosen to which the information is to be sent for the further processing. The instruction module 422 may evaluate the data and determine that no destination for the data has been specified. Then the instruction module 422 may call for the execution of the destination determination module 426, which may determine to which remote diagnostic device 30 to send all or some of the information. The destination determination module 426 may make this determination based on the type of data, the content of the data, and any indications of what return data is desired. For example, the data may include diagnostic trouble codes for a certain vehicle, thus the destination determination module 426 may direct the data to the remote diagnostic device 30 that can interpret the diagnostic trouble codes for that vehicle and provide potential causes of the diagnostic trouble codes and possible top fixes. In the same example, there may also be vehicle performance measurements, which the destination determination module 426 may decide should be sent to the remote diagnostic device 30 that is capable of analyzing such data. Further, the command may include an indication that suggestions for addressing any faults or irregularities identified may be requested, thus the request may be sent to the remote diagnostic device 30 capable of fulfilling the request and providing top fixes. In these examples, the remote diagnostic device 30 may be individual devices or any of them may be combined with another.

In embodiments where the information is received or sent by the remote information device 20 in real-time, the destination determination module 426 may be executed in real-time. As the information is received, the destination determination module 426 may analyze each piece of data as it arrives and assign each piece of data, or a series of pieces of data an appropriate destination. The data may then be sent off to its destination in real-time. The data may contain various pieces of information, not all of which are appropriate for a single destination. During real-time execution of the destination determination module 426, each piece of data may be analyzed individually and assigned the appropriate destination and sent to its destination in real-time.

The raw, or even processed, data received by the remote information device 20, from either of the devices 10, 30, may not be in a useable format for its destination device. The instruction module 422 may recognize that the format of the data is incorrect for the destination and request the data formatting module 428 to convert the data into the correct format depending on the destination assigned to the data. For example, the data may be received as raw binary data, however, the destination for the data only accepts data in an extensible markup language (XML) format. Thus, the data formatting module 428 may have to read the received binary data, interpret the meaning of the data, and convert it to XML by parsing the data into, for example, Unicode, and apply the appropriate XML tags to the parsed data to identify the different sections of the data. The data formatting module 428 may be able to convert various file formats to other file formats, such as scalable vector file formats, markup language formats, text document formats, database file formats, etc.

The data formatting module 428 may also be executed in real-time. As the information arrives, and the destination is determined, the information may be analyzed, the current and required formats identified, and the format converted, all in real-time by the data formatting module 428. Some information may be passed on in real-time once that portion of the information has been properly formatted. In other instances, the formatting may need to be completed before the information may be passed along. In the latter instance, the formatting may still execute in real-time, reducing the amount of time it would take to complete the formatting process, and finalize the formatting once all of the information is received.

While analysis of the data from the portable vehicle diagnostic tool 10 may occur on the remote diagnostic device 30, it is also considered that the remote information device 20 may conduct analysis of this data. Likewise, the remote information device 20 may also analyze data received from the remote diagnostic device 30. Upon receiving a command to evaluate the data received, the instruction module 422 may call to execute the data analysis module 430. The analysis conducted by the data analysis module 430 may be dependent on the information received and/or the information needed to send to complete a task. The data analysis module 430 may extract from or convert the data into information that is representative of the data but differently presented to the device for which it is destined. For example, a series of raw vehicle performance measurements or vehicle diagnostic codes from the portable vehicle diagnostic tool 10 may not be useful if the information is to be sent to a remote diagnostic device 30, which requires a descriptive phrase of an issue or symptom. Further, some data may be too extensive for practical use in some applications, thus the data analysis module 430 may be able to parse sets of data that are too large for practical use into smaller representative sets, or even into single representative values for multiple measurements.

The data analysis module 430 may also be executed in real-time. Where the information is received, the data analysis module 430 may be executed to analyze the data in real-time. Then the analyzed data could be displayed or sent off to its destination once the analysis is complete, or in real-time. For a given set of data fully received, the data analysis module 430 may still be executed for real-time displaying or sending of the analyzed data.

As discussed herein, the portable vehicle diagnostic tool 10 may lack the ability to provide instructions to the remote information device 20 and/or the remote diagnostic device 30. The remote information device 20 may include the command module 434 for providing the remote diagnostic device 30 with commands, queries, requests, and the like. The command module 434 may determine what information, related to the information received from the portable vehicle diagnostic tool 10 and/or the command from the user, is desired and request that the remote diagnostic device 30 return that information. The determination may be made based on the remote information device's analysis of the information provided to it, based on settings set by a user as described herein, based on a command selection made by the user, or a combination of these. The request may include a query for related information or a command for analysis of the information being provided. Some such related information or analysis may include: interpretations of the diagnostic trouble codes and/or vehicle performance measurements; vehicle component failure diagnoses; related symptom information; possible failure and symptom causes; suggested popular or likely top fixes for the symptoms and failures; repair statistics for the suggested fixes (e.g. cost, time, difficulty, and likelihood of success to solve the issue); potential issues that may arise because of the existing issue and preventative maintenance advice for the potential issues; peripheral issues that may have contributed to the existing issue that may require attention and fixes for the peripheral issues; parts information (e.g. type, brand, model, specifications, price, availability, location, and technical bulletins); and vehicle information (e.g. vehicle history including accident, repair, maintenance, owners, and technical bulletins).

In one embodiment, real-time implementation of the command module 434 is possible. As information is received by the remote information device 20, the determination may be made as to what information is desired and what request is to be made to the remote diagnostic device 30. Moreover, once each determination is made on the information received, the request may also be made in real-time.

Other commands from the user may initiate the settings module 438, which may alter and save various setting of the remote information device 20 and the automotive diagnostic server system 5. The settings module 438 may affect settings of the remote information device 20 that affect how the instruction module 422 evaluates information and determines how to handle the information. For example, settings may include the information sought in return after sending data to the remote diagnostic device 30. In turn, this may affect how the instruction module 422 determines which functions of the remote information device 20 to call. The settings may further affect the manner in which those functions interact with the data. A setting for retrieving a certain type of information may influence the destination determination module 426 to identify a particular remote diagnostic device 30 to send the data to, the data formatting module 428 may display further options for settings or data relating to the certain type of data, and the data analysis module 430 may analyze and/or manipulate data to achieve completion of the request.

The input module 436, as described herein, may also be executed in real-time. For the most part, when the remote information device 20 is not busy executing other tasks, the input module 436 is ready to be executed when an input is received. However, if the remote information device 30 is running another process, the input module 436 may not execute until the running process is complete. The action to execute the input module 436 may be put in a process queue, or disregarded when another process is running. In a real-time execution of the input module 436, the input module 436 may respond to an input as it is received, regardless of other implemented processes. In one embodiment, the input module 436 may interrupt a running process. This may be the favored execution when modifications to functions may be desired as they are running on the remote information device 30. In another embodiment, the input module 436 may run as a parallel process to another running process. This implementation may be useful when handling multiple data sources at once, and not having to wait for a process to end to manage an unrelated process provides a more efficient system.

Figure 4:
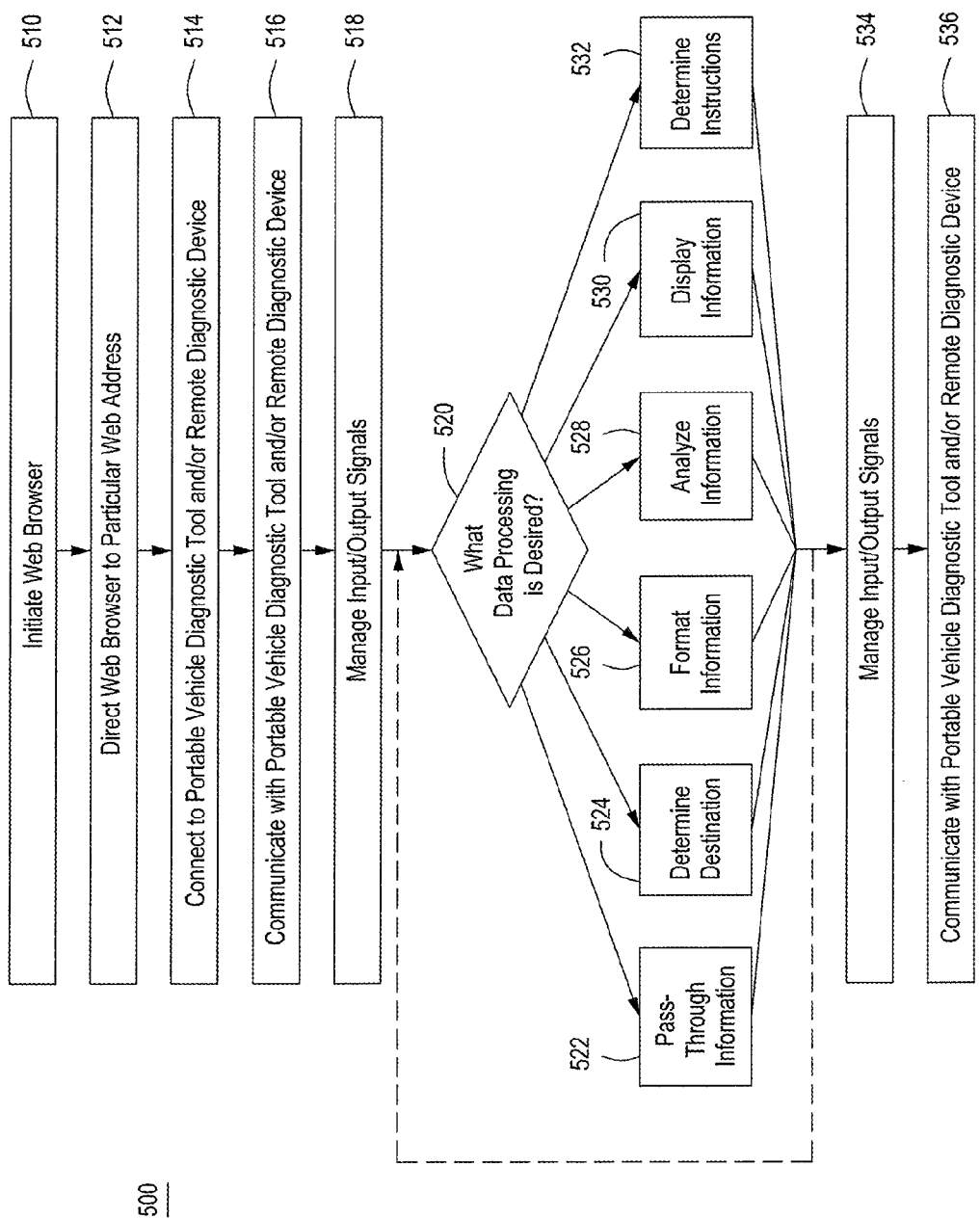
FIG. 4 is a flowchart illustrating steps that may be followed to implement a system for an automotive diagnostic server according to an embodiment of the invention.

Referring now to FIG. 4, illustrated is a flow diagram of a method for implementing a system for an automotive diagnostic server. In the method 500, the steps described may occur in a various orders and combinations. The description herein is exemplary and not meant to be limiting. It is also important to note that any of the following steps may be executed in real-time as described herein.

The method 500 may begin by initiating an instance of the program software (step 510), in this example by opening a web browser on the remote information device 20, and directing the web browser to a particular web address (step 512). The web browser may be programmed to automatically be directed to the web address, for example, in a commonly available web browser the web address may be set as the web browser's homepage, or in a proprietary web browser, the web browser may be limited to connecting to web addresses relating to the automotive diagnostic server system 5. Alternatively, the user may manually direct the web browser to the web address, for example, by typing in the URL or by selecting the web address from an item where the web address is stored. It is also considered that the user may find the web address through the use of a search engine that provides a link to the web address.

The web address to which the web browser is directed may be a web address hosted by the web server module 400 of the portable vehicle diagnostic tool 10. Alternatively, the web address may be a generic web address for a service provided by a hosting company, and through this service the remote information device may be directed to an appropriate web address hosted by the web server module 400 of a particular portable vehicle diagnostic tool 10.

Once directed to the appropriate web address through the web browser, the remote information device 20 connects to the portable vehicle diagnostic tool 10 and/or the remote diagnostic device 30 (step 514). This way the remote information device 20 connects to the diagnostic tool 10 and/or the remote diagnostic device 30 without determining the communication protocols used by the respective devices.

In another embodiment, connecting the remote information device 20 to one or more of the other devices 10, 30, may involve sending a connection request to the other devices 10, 30. After sending the connection request, the remote information device 20 may wait for a confirmation signal from the other devices 10, 30, establishing the connection, or a rejection signal from the other devices 10, 30, refusing the connection. If no response signal is received by the remote information device 20 after a specific amount of time or a predetermined number of times, the remote information device 20 may resend the request to connect. The process of waiting for a response signal and resending the request to connect may be repeated a set number of times. If, after the set number of times is reached without a response, the remote information device 20 may attempt to connect to a different one of the other devices 10, 30, or indicate that the connection attempt has failed.

Alternatively, the remote information device 20 may listen for and receive a connection request for connecting to the portable vehicle diagnostic tool 10 and/or the remote diagnostic device 30. The connection request may be received from one of the devices 10, 30, to setup a new connection with the remote information device 20, for example, for the first time or to establish a new connection after a previous connection was terminated after completion of a communication session. In some instances the communication session maybe interrupted before it is complete, and the connection request may be received to reestablish the connection. Once receiving the connection request, the remote information device 20 may send a confirmation signal to establish the connection, or send a rejection signal or no signal to refuse the connection.

Once a connection between the remote information device 20 and one or more of the other devices 10, 30, has been established (step 514), the remote information device 20 may communicate with the other connected devices 10, 30 (step 516). In communicating with the other devices 10, 30, the remote information device 20 may send and receive queries and requests for data. The queries and requests sent by the remote information device 20 may be formulated by the user, through the selection of options displayed to the user in the web browser, or by direct input through typing the request or query into a field in the web browser. The remote information device 20 may also transmit and receive data in the form in which the data was received or in an altered form, where the data is altered by the remote information device 20. The decision to alter the data may be made by software as described herein, or by the user. Through the web browser, the user may make selections of options to alter the data in predefined ways. The web browser may also provide the user an interface to manually alter the data, such as allowing the user to select data based on time or other parameters.

An example of the remote information device 20 communicating may include the remote information device 20 querying the remote diagnostic device 30 for information related to data received from the portable vehicle diagnostic tool 10, or querying the portable vehicle diagnostic tool 10 for data related to information received from the remote diagnostic device 30. Another example may include the remote information device 20 receiving information from either device 10, 30, and sending it to the other device 10, 30, either in the form it was received or in an altered form. The remote information device 20 may also receive information from and send information to the same device 10, 30, without communicating with the other device 10, 30. It is also possible for the remote information device 20 to send information without first receiving information or a request for information, or receive information without subsequently sending any information.

The remote information device 20 may also manage the input/output signals it receives/sends (step 518). Managing the input/output signals may involve keeping track of the source of input signals, the destination of output signals, and the order in which to handle the signals. In keeping track of the signals, the remote information device 20 may read information tagged with an identification of where it came from and where it may be going or any urgency tags that may have been placed on the information. Alternatively, the remote information device 20 may have to apply source and/or destination tags to information packets. Part of keeping track of the signals may involve keeping a record in memory of the location, destination, and time or order which information packets are received or sent. In this step, the remote information device 20 may have to keep track of information from multiple sources. For example, the remote information device 20 may be used in connection with more than one portable vehicle diagnostic tool 10, and may be required to keep track of what data came from and should be sent to which portable vehicle diagnostic tool 10. A similar situation may apply to more than one remote diagnostic device 30.

When the remote information device 20 has information it may determine if any data processing is desired (step 520). In some instances the remote information device 20 may determine that the information received, from either the portable vehicle diagnostic tool 10 or the remote diagnostic device 30, is desired to be passed to its destination without any other processing. Alternatively, it is possible that the user is tasked with making the decision as what to do with the information and may select an option through the web browser to allow the data to pass through without alteration. In such an instance the remote device 20 passes-through the information (step 522) without further processing. In a circumstance where the remote information management device 20 acts as a pass-through for the information, the information likely includes location tags for its source and destination. The information does not have to be correctly formatted because it may be possible that the destination device for the information may be able to format the information once it is received.

In some instances, the remote information device 20 may have to determine the destination for information it has (step 524). Unlike the previous step 516, at step 518 the remote information device 20 may have to analyze the data to determine where to send it, as opposed to keeping track of data. The remote information device may make the determination based on one or more factors. Such factors may include the content and/or format of the data, an indication of a desired returned result or information, such as a preset setting or option selection made by the user though the web browser, the availability or location of one or more destination devices 10, 30, or the amount of traffic on the communication network 40. By analyzing the data the remote information device 20 has, it may be able to match the content or the format of the information with the input requirements or ability to accept the information with specific remote diagnostic devices 30.

For example, if the remote information device 20 receives the diagnostic test results for a vehicle's electronic safety control system from the portable vehicle diagnostic tool 10, then based on the information, the remote information device 20 may determine that there is a remote diagnostic device 30 that can handle requests for data or analysis related to the vehicle's electronic safety control system. Such a remote diagnostic device 30 may be programmed for specific vehicles, safety systems, electronic systems, a combination of systems or vehicles, or may be generally able to handle all requests.

Different devices 10, 30, are not necessarily programmed so that they produce standardized outputs. In some instances, for the devices 10, 30, to be able to communicate with each other, the remote information device 20 may have to format the data that it receives from and sends to the devices 10, 30 (step 526). It is possible that different manufactures or even different equipment from the same manufacturer use different formats. Even the vehicles under test may provide information differently to the portable vehicle diagnostic tool 10. Sometimes, the information received by the remote information device 20 from the devices 10, 30, may be in a format that is not recognized or is not useable if it was simply passed on to the other devices 10, 30. The remote information device 20, in knowing the destination of the information that it sends, may also know the formats, which are acceptable to the destination devices 10, 30. In those circumstances, the remote information device 20 may reformat the data, while keeping the integrity of what the data represents, so that it is acceptable for the destination devices 10, 30.

The remote information device 20 may also be capable of doing its own data analysis (step 528). In some instances the data provided by the devices 10, 30, may need further refinement to be used by the other devices 10, or to be understood by a user. For example, the portable vehicle diagnostic tool 10 may provide to the remote information device 20 a record of measurements taken of engine performance during testing. The record may contain data over an extended period of time of numerous engine parts and systems that were monitored and recorded during the testing. The remote information device 20 may be instructed, either by the program or by the user's selection through the web browser, to retrieve information relating to the engine valve timing data recorded.

Alternatively, the remote information device 20 may analyze the data, either instructed to do so by the program or by the user's selection through the web browser, and determine that there is an issue with the engine valve timing. Then, the remote information device 20 may retrieve information relating to the recorded engine valve timing data. In either situation, the remote information device 20 may analyze, or further analyze, the data to extract the engine valve timing measurements and data closely related to engine valve timing that may affect the engine valve timing. In some embodiments, the data may also be analyzed to determine where abnormalities occurred and those portions may be indicated or extracted from the rest of the data. Other embodiments may provide a summary analysis of the data when the amount of data is too large to send and a representative summary of the data is sufficient.

An embodiment of the remote information device 20 may include a display 240 in which it will display the information it has received and/or altered in the user interface of the web browser (step 530). The display is not limited to information that it has received from the devices 10, 30, or any alterations thereof. The remote information device 20 may display options through its web browser GUI for managing, analyzing, and formatting the information.

Another step in the method may include determining instructions for the other devices 10, 30 (step 532). As discussed herein, the remote information device 20 may have the ability to analyze information it receives to determine what return data is desired from the destination devices 10, 30. The remote information device 20 may also make this determination based on user settings or selections made through the web browser that have specified the desired return information for a specific instance or for a type of information provided. A command, request, query, or the like is associated with the information that is sent to the other device to instruct it on what to do with the information or what return information is desired.

When determining if any data processing is desired (step 520), the remote information device 20 may determine that one or more of the data processing functions (steps 522-532) are desired. The data processing functions (steps 522-532) may occur in parallel, in series, or in various orders determined by the processor of the remote information device 20.

After the remote information device 20 has determined if any data processing is desired (step 520), and it has executed its data processing functions (steps 522-532), then the remote information device 20 may again manage the input/output signals (step 534) much like in step 518, and communicate with the devices 10, 30 (step 536) much like in step 516.

FIGS. 1-4 are diagrams and flowcharts of methods and systems according to various embodiments of the present invention. The method steps described herein are applicable to any of the devices 10, 20, 30. It will be understood that each step of the flowchart illustration, and combinations of steps in the flowchart illustration, can be implemented by computer program instructions or other means. Although computer program instructions are discussed, an apparatus according to the present invention can include other means, such as hardware or some combination of hardware and software, including one or more processors or controllers, for performing the disclosed functions.

What is claimed is:

1. A method for communicating with a diagnostic tool, comprising the steps of:
   retrieving vehicle diagnostic data from a vehicle with the diagnostic tool;
   providing a web page via a web server module that is stored in a memory of the diagnostic tool;
   receiving a connection request from a remote computing device to access the web page;

connecting the remote computing device to the diagnostic tool over a communication network via a communication interface of the remote computing device and the diagnostic tool;

receiving input signals from the remote computing device via the communication interface of the diagnostic tool;

performing a function on the diagnostic tool based on the input signals; and sending information based on the function to the remote computing device.

2. The method of claim 1 further comprising the step of:
receiving top fixes based on the vehicle diagnostic data by the remote computing device or by the diagnostic tool.

3. The method of claim 1, wherein the performing the function step includes passing-through the vehicle diagnostic data from the diagnostic tool to the remote computing device.

4. The method of claim 1, wherein the performing the function step includes determining a destination for the vehicle diagnostic data.

5. The method of claim 1, wherein the performing the function step includes:
processing the vehicle diagnostic data; and
displaying the processed data on a display of the diagnostic tool.

6. A vehicle diagnostic tool, comprising:
a processor configured to execute program modules;
a memory configured to store the program modules;
a communication interface configured to connect with a connector in a vehicle and retrieve vehicle diagnostic data from the vehicle;
a display configured to display information; and
a communication device configured to communicate with a remote computing device over a communication network, wherein the program modules comprises a web server module configured to provide a web page on the display, the web page hosted on the vehicle diagnostic tool that is accessible by the remote computing device and a data analysis module configured, when instructed, to analyze the vehicle diagnostic data.

7. The tool of claim 6, wherein the remote computing device directs the vehicle diagnostic tool to perform a function through the web page.

8. The tool of claim 7, wherein the function is to retrieve top fixes from the remote computing device.

9. The tool of claim 7, wherein the function is to instruct the vehicle diagnostic tool to act as a pass-through device and pass through the vehicle diagnostic data.

10. The tool of claim 6 further comprising of a web browser module configured to view a web page on the remote computing device.

11. The tool of claim 6, wherein the web page displays vehicle diagnostic data.

12. The tool of claim 6, wherein the remote computing device instructs the vehicle diagnostic tool to analyze the vehicle diagnostic data.

13. The tool of claim 6, wherein the program modules further comprising a data formatting module configured to format the vehicle diagnostic data to a format recognized by the remote computing device.

14. A vehicle diagnostic tool, comprising:
means for processing configured to execute program modules;
means for storing configured to store the program modules;
means for displaying configured to display information;
means for interfacing with a connector in a vehicle and configured to retrieve vehicle diagnostic data from the vehicle; and
means for communicating with a remote computing device over a communication network, wherein the program modules comprises a web server module configured to provide a web page on the means for displaying, the web page hosted on the vehicle diagnostic tool that is accessible by the remote computing device and a data analysis module configured, when instructed, to analyze the vehicle diagnostic data.

15. The tool of claim 14, wherein the remote computing device directs the vehicle diagnostic tool to perform a function through the web page.

16. The tool of claim 15, wherein the function is to retrieve top fixes from the remote computing device.

17. The tool of claim 15, wherein the function is to instruct the vehicle diagnostic tool to act as a pass-through device and pass through the vehicle diagnostic data to the remote computing device.

18. The tool of claim 14 further comprising of a web browser module configured to view a web page on the remote computing device.

19. The tool of claim 14, wherein the web page displays vehicle diagnostic data.

20. The tool of claim 14, wherein the remote computing device instructs the vehicle diagnostic tool to analyze the vehicle diagnostic data.

21. A vehicle diagnostic tool, comprising:
a processor configured to execute program modules;
a memory communicatively linked to the processor and configured to store the program modules and software to operate the vehicle diagnostic tool;
a display configured to display information;
an input device configured to receive inputs;
a communication interface configured to connect with a connector in a vehicle and retrieve vehicle data from the vehicle; and
a communication device configured to communicate with a remote computing device over a communication network, wherein the program modules comprises a web server module configured to provide a web page on the display, the web page hosted on the vehicle diagnostic tool that is accessible by the remote computing device and a data analysis module configured, when instructed, to analyze the vehicle data.

22. The tool of claim 21, wherein the remote computing device directs the vehicle diagnostic tool to perform a function through the web page.

23. The tool of claim 22, wherein the function is to retrieve top fixes from the remote computing device.

* * * * *